United States Patent Office 3,029,053
Patented Apr. 10, 1962

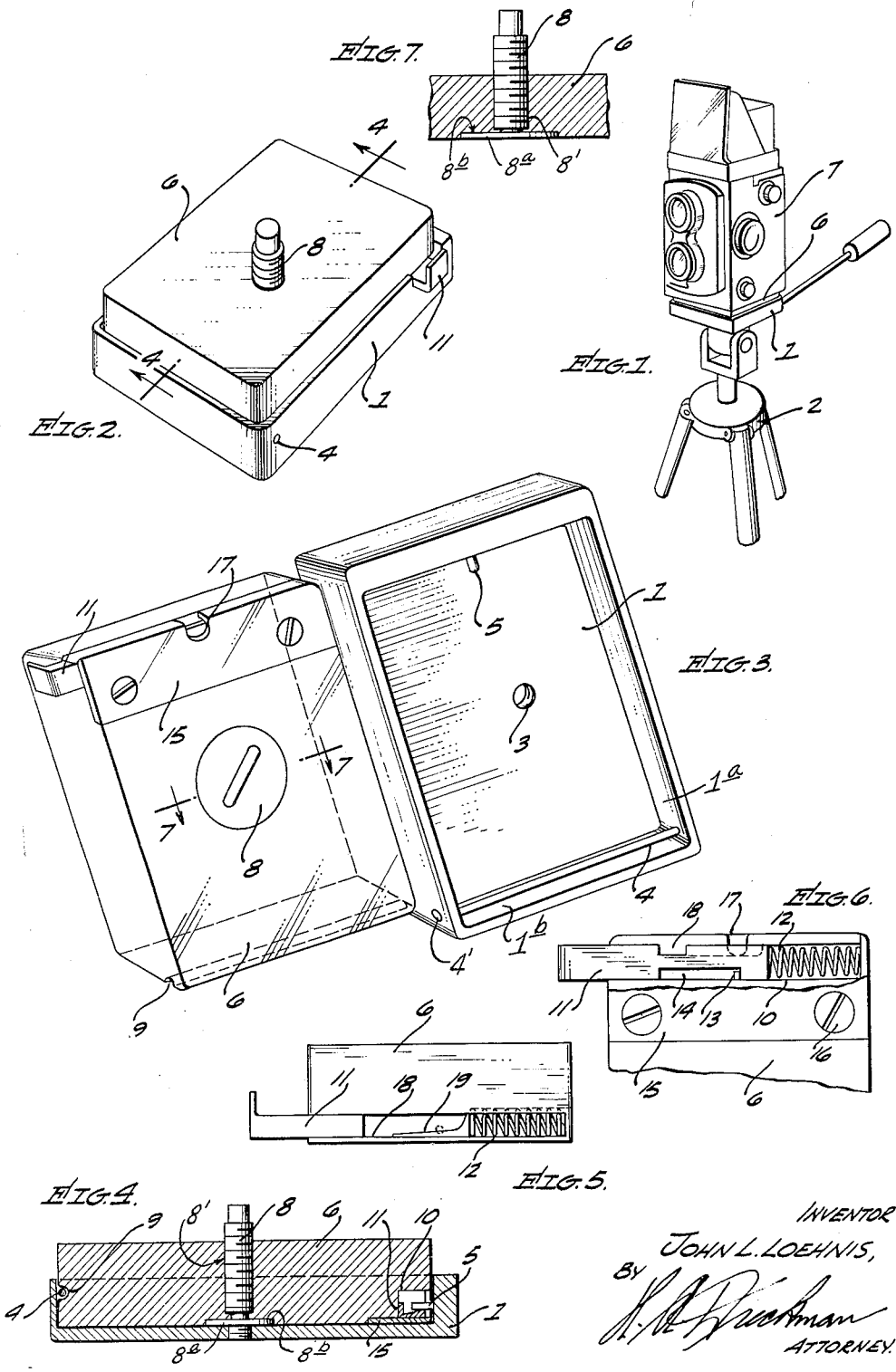

3,029,053
DETACHABLE TRIPOD MOUNT
John L. Loehnis, 420 Roosevelt Road, Long Beach, Calif.
Filed Dec. 12, 1960, Ser. No. 75,342
3 Claims. (Cl. 248—187)

This invention relates to a detachable tripod mount, particularly applicable for cameras, transits, levels, and other precision instruments where it is desired to attach and detach the instrument from the tripod at frequent intervals.

An object of my invention is to provide a novel tripod mount of the character stated in which the instrument, such as a camera, may be fixedly mounted on the tripod by a detachable coupling, one-half of which is secured to the tripod and tne other half secured to the instrument, such as a camera.

Another object of my invention is to provide a novel latching means between the two parts of the tripod mount or coupling, such latch being easily releasable by finger pressure; but under normal conditions the latch holds the parts of the tripod mount securely coupled and interlocked.

Another object of my invention is to provide a novel tripod mount of the character stated, in which each part of the mount can be firmly secured, one part to the instrument and the other part to the tripod, and also where the part which is attached to the instrument can serve as a level base when the instrument is resting on a surface other than the tripod.

Still another object of my invention is to provide a novel tripod mount of the character stated which is simple in construction and relatively inexpensive to manufacture.

Other objects, advantages and features of invention may appear from the accompanying drawing, the subjoined detailed description and the appended claims.

In the drawing:

FIGURE 1 is a perspective view of my tripod mount attached to a camera and mounted on a tripod.

FIGURE 2 is a perspective view of my tripod mount on a larger scale.

FIGURE 3 is a perspective disassembled view on a still larger scale of my tripod mount.

FIGURE 4 is a sectional view taken on line 4—4 of FIGURE 2.

FIGURE 5 is an end view of one portion of the tripod mount with the cover plate removed.

FIGURE 6 is a fragmentary bottom plan view of the portion of the tripod mount shown in FIGURE 5 and with parts broken away to shown interior construction.

FIGURE 7 is a fragmentary sectional view taken on line 7—7 of FIGURE 3.

Referring more particularly to the drawing, the numeral 1 indicates a tray which is open at the top, but which has side walls 1a and end walls 1b thereon substantially as shown. The portion 1 of the mount is secured to the tripod 2 by means of a suitable cap screw which threads into the hole 3 in the bottom wall of the portion 1 or tray of the mount. A bar 4 extends transversely across one end of the tray and this bar is slightly spaced from an end wall of the tray for a purpose which will be subsequently described. The bar 4 fits in holes 4' in the side walls 1a. A pin 5 extends horizontally from the wall of the tray 1 opposite the bar 4; the purpose and function of this pin will also be subsequently described.

A lock plate 6 fits accurately within the tray 1 and the upper surface of the lock plate is suitably shaped or contoured to fit the bottom surface of the instrument, such as the camera 7, which is to be mounted on the tripod 2. The lock plate 6 is fixedly attached to the bottom surface of the camera or the like 7 by means of a cap screw 8 which extends through a hole 8' in the lock plate and threads into the camera or other instrument 7. The head 8a of the cap screw 8 fits in a recess 8b in the lock plate 6. Thus the lock plate is fixedly attached to the camera and can be moved from place to place with the camera as desired. The head of the cap screw 8 is preferably countersunk into the bottom of the lock plate 6 so that the lock plate, when in position in the tray 1, will fit accurately within that tray and a smooth surface will thus be provided on the bottom of the lock plate. A transverse groove 9 is formed in one end of the lock plate 6 and this groove fits over the bar 4 as shown in FIGURE 4, thus holding one end of the lock plate in position. The other end of the lock plate 6 is detachably latched to the tray 1 in the following manner:

A transverse notch or groove 10 is formed in the lock plate 6, and within this groove there is mounted a latch keeper 11. A spring 12 bears against one end of the keeper 11 for the purpose of urging this keeper outwardly relative to the lock plate. To prevent the keeper 11 from being pushed out of the lock plate a stop pin 13 is provided which fits into a groove 14 in the keeper 11, thus limiting sliding movement of the keeper. A cover plate 15 is secured to the lock plate 6 by means of screws 16, thus covering the notch 10 as well as the keeper 11 and the spring 12. A notch or groove 17 in the cover plate 15 permits the pin 5 to enter through the cover plate, and when the keeper 11 is pushed inwardly against the tension of the spring 12 an opening 18 in the keeper aligns with the notch 17, thus permitting the pin 5 to extend into the keeper 11 where it is engaged by the cam surface 19. This cam surface securely holds the lock plate 6 against the bottom of the tray 1 until the keeper 11 is again pressed inwardly to align the opening 18 and the notch 17, which will then permit separation of the lock plate 6 and the tray 1 so that the camera 7 or other instrument can be removed from the tripod 2.

Having described my invention, I claim:

1. A detachable tripod mount for instruments comprising a tray, means for securing the tray to a tripod, a lock plate fitting into the tray, means for removably securing the lock plate to an instrument, a bar mounted at one end of the tray, said lock plate having a groove therein to receive the bar in one position of the parts, a pin at the end of the tray opposite the bar, a latch keeper slidably mounted in the lock plate at the end opposite said groove, said lock plate having a notch therein extending to the keeper to permit engagement of the keeper with said pin to latch the lock plate and the tray together.

2. A detachable tripod mount for instruments comprising a tray, means for securing the tray to a tripod, a lock plate fitting into the tray, means for removably securing the lock plate to an instrument, means separably securing one end of the tray and the lock plate together, a pin on the tray opposite the means separably securing the tray and lock plate together, a latch keeper slidably mounted in the lock plate at the end opposite said means separably securing the tray and lock plate together, said lock plate having a notch therein extending to the keeper to permit engagement of the keeper with said pin to latch the lock plate and the tray together.

3. A detachable tripod mount for instruments comprising a tray, means for securing the tray to a tripod, a lock plate fitting into the tray, means for removably securing the lock plate to an instrument, a bar mounted at one end of the tray, said lock plate having a groove therein to receive the bar in one position of the parts, said lock plate having a recess therein opposite said groove, a keeper slidably mounted in the recess, a spring bearing against the keeper to press the keeper outwardly, a cover plate attached to the lock plate and covering said recess, a pin projecting from the tray at the end opposite said bar, said cover plate having a notch therein and said keeper having an opening therein alignable with the notch in one position of the parts, said pin being adapted to extend through the notch and the opening and engaged by the keeper in one position of the parts.

References Cited in the file of this patent

UNITED STATES PATENTS

| | | |
|---|---|---|
| 1,001,958 | Jacob | Aug. 29, 1911 |
| 1,743,184 | Beidler | Jan. 14, 1930 |
| 2,536,170 | Guest | Jan. 2, 1951 |
| 2,615,664 | Reeves | Oct. 28, 1952 |
| 2,962,135 | White | Nov. 29, 1960 |